June 22, 1943. C. L. OSBORN 2,322,312
WINDSHIELD WIPER
Filed Oct. 17, 1941
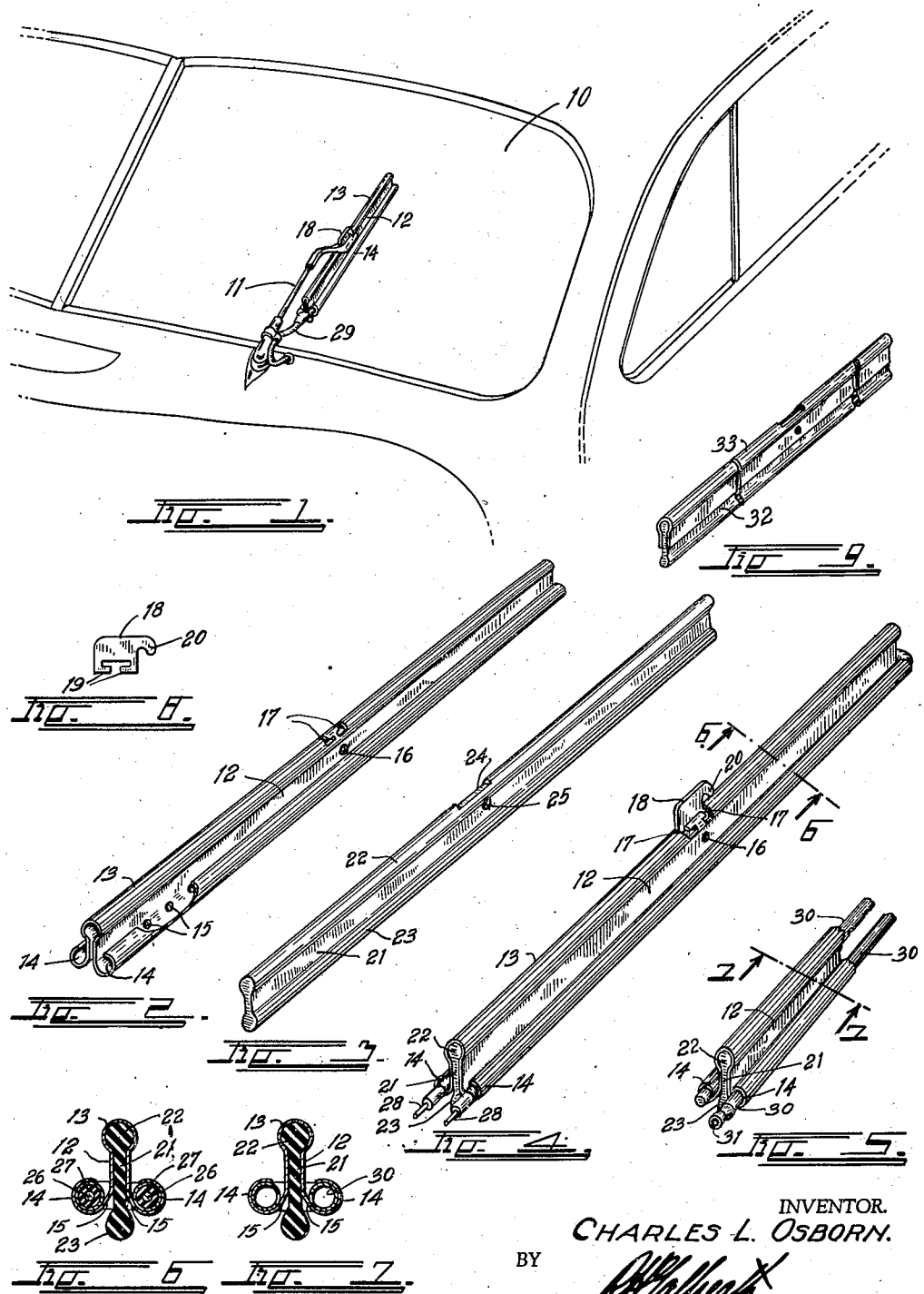
INVENTOR.
CHARLES L. OSBORN.
BY
ATTORNEY.

Patented June 22, 1943

2,322,312

UNITED STATES PATENT OFFICE 2,322,312

WINDSHIELD WIPER

Charles L. Osborn, Cheyenne, Wyo.

Application October 17, 1941, Serial No. 415,367

2 Claims. (Cl. 15—250.5)

This invention relates to a windshield wiper for use on all types of vehicles, more especially automobiles and aircraft.

The principal object of this invention is to provide an "all weather" windshield wiper which can be used under any conditions which may be encountered, such as rain, dust, sleet, snow, and ice.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a fragmentary perspective view illustrating the appearance of the windshield wiper in use;

Fig. 2 is a perspective view of the shell of the improved wiper;

Fig. 3 is a similar view of the wiping element removed from the shell;

Fig. 4 is a similar view illustrating the wiper assembled for cold weather use;

Fig. 5 is a fragmentary, perspective view illustrating the wiper assembled for warm weather or dusty conditions;

Fig. 6 is a cross section, taken on the line 6—6, Fig. 4;

Fig. 7 is a similar cross section, taken on the line 7—7, Fig. 5;

Fig. 8 is a detail view of an attachment clip employed with the invention;

Fig. 9 is a fragmentary perspective view of an alternate construction for the wiper element of the improved wiper.

For the purpose of illustration an automobile windshield is indicated at 10 with the usual swinging windshield wiper arm at 11.

The improved windshield wiper comprises an elongated shell 12 approximately V-shaped in cross section and formed with a longitudinally extending apex tube 13 and two rolled edges forming partially open edge tubes 14. The apex tube opens to the hollow interior of the shell. The sides of the shell opposite the edge tubes 14 are perforated with drainage holes 15 and the middle of the shell is provided with openings 16 for accommodating a certain type of windshield wiper arm.

The apex tube 13 is formed with laterally extending L-shaped notches 17 for receiving an attachment clip 18 to adopt the wiper to other types of windshield arms. The clip 18 has two L-shaped legs 19 which slip into the notches 17 from the side to hold the clip in place. The clip is also provided with a hook portion 20 for receiving the cross pin of a standard wiper arm 11.

The shell 12 is designed to receive a rubber wiper element 21, as shown in Fig. 3. The wiper element is formed with an inner longitudinal edge bead 22 which slides within the apex tube 13 and with a similar outer, longitudinally-extending, edge bead 23 which contacts the glass uniformly at all angular positions of the wiper. The wiper element projects beyond the two edge tubes 14, as shown in Fig. 6, so that its projecting edge can be flexed to either side.

The middle of the bead 22 is notched, as shown at 24, to allow space for the clip 18. The engagement of this notch with the clip prevents the wiper element from sliding endwise from the shell 12 and the inherent resiliency of the wiper element squeezes the clip 18 into place in the top of the tube 13. The wiper element is also perforated, as shown at 25, to align with the perforations 16 of the shell.

As thus far described, the device makes a very efficient windshield wiper. As it moves in one direction, the lower bead swings against one of the edge tubes 14 and when moved in the other direction, it swings against the other tube. The tubes serve as a backing to limit and stiffen the swinging movement of the wiper element.

For sleet and ice conditions, a length of electrical resistance wire 26, covered with suitable insulation 27, is strung through the two edge tubes 14. The wire 26 terminates in suitable connectors 28 which connect with a conductor 29 leading to the car battery.

It can be readily seen that the heat from the wire 26 will be communicated to the metal surrounding the apex tube 13. This heat will in turn be communicated to the wiper element as the latter swings against the sides of the shell so that the wiping edge of the element will be constantly maintained warm to melt away snow, ice, and sleet.

Snow striking the wiper as the vehicle moves is driven into the open sides of the tubes 14 and is melted by the heat of the hot wire. This warm water then runs through the drainage openings 15 to the wiping edge of the element constantly supplying it with warm water for washing the glass surface and for melting snow and ice therefrom.

For summer use, a perforated water tube 30 is run through the two edge tubes 14 in a manner similar to the positioning of the wire 26 and the tube is connected by means of a suitable connector 31 with any convenient water source. The water from the perforations in the tube 30 flows through the holes 15 of the shell and constantly supplies the wiper element with wash water for washing away dust, dirt, snow and ice. Instead of water the tube 30 may be supplied with anti-freeze solution for melting and removing snow and ice in the winter if desired.

In Fig. 9, an alternate type of insert is illustrated for the shell 12. In this type, a flexible rubber windshield wiper element 32 is permanently carried in a tubular backbone 33 which is slid within the shell 12 similarly to the former element 21. This form provides additional stiffness and also facilitates the insertion of the element.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A windshield wiper comprising: an elongated shell having a substantially V-shaped cross section; a first longitudinally extending tube formed along the apex of said shell opening between the sides thereof; two longitudinally extending edge tubes along the flaring edges of said shell; a flexible wiper element; an upper bead along said wiper element contained within the apex tube; an electrical heating element in each edge tube; and a lower bead along said wiper element projecting beyond the edge tubes, there being openings communicating between the edge tubes and the interior of said frame to allow the heat rays and heated water to flow to the lower bead.

2. A windshield wiper blade comprising: an elongated flexible wiper element; a rounded bead extending along each longitudinal edge of said element; a tubular metallic backbone enclosing one of said beads and extending along one edge of said element; an elongated sheet metal member bent back on itself along its medial line to form an apex tube enclosing said backbone; outwardly and backwardly rolled edges on said sheet metal member positioned in spaced relation to and parallel with the second bead of said element; and a heating element enclosed in each of said rolled edges.

CHARLES L. OSBORN.